United States Patent
Mannherz et al.

(10) Patent No.: US 10,442,421 B2
(45) Date of Patent: Oct. 15, 2019

(54) METHOD AND DEVICE FOR DETERMINING THE FUNCTIONAL CAPABILITY OF A BRAKE SYSTEM, BRAKE SYSTEM FOR A VEHICLE

(71) Applicant: Robert Bosch GmbH, Stuttgart (DE)

(72) Inventors: Edith Mannherz, Weinsberg (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 15/665,345

(22) Filed: Jul. 31, 2017

(65) Prior Publication Data

US 2018/0086325 A1 Mar. 29, 2018

(30) Foreign Application Priority Data

Sep. 29, 2016 (DE) .......................... 10 2016 218 898

(51) Int. Cl.
| | |
|---|---|
| *B60T 8/32* | (2006.01) |
| *B60T 8/48* | (2006.01) |
| *B60T 13/66* | (2006.01) |
| *B60T 13/74* | (2006.01) |
| *B60T 17/22* | (2006.01) |
| *B60T 8/172* | (2006.01) |

(52) U.S. Cl.
CPC ............ *B60T 17/221* (2013.01); *B60T 8/172* (2013.01); *B60T 8/32* (2013.01); *B60T 13/662* (2013.01); *B60T 13/741* (2013.01); *B60T 13/746* (2013.01); *B60T 8/4872* (2013.01); *B60T 2270/413* (2013.01)

(58) Field of Classification Search
CPC .......... B60T 8/32; B60T 8/172; B60T 8/4872; B60T 13/662; B60T 13/741; B60T 13/746; B60T 17/221; B60T 2270/413
USPC .................................... 303/3, 20; 701/70, 71
See application file for complete search history.

(56) References Cited

U.S. PATENT DOCUMENTS

| | | | |
|---|---|---|---|
| 2005/0046271 A1* | 3/2005 | Suzuki .................. | B60T 13/741 303/20 |
| 2013/0325278 A1* | 12/2013 | Bieltz ..................... | B60T 7/107 701/70 |
| 2014/0015310 A1* | 1/2014 | Hanzawa .................. | B60T 7/12 303/3 |

(Continued)

*Primary Examiner* — Robert A. Siconolfi
*Assistant Examiner* — San M Aung
(74) *Attorney, Agent, or Firm* — Maginot, Moore & Beck LLP

(57) ABSTRACT

A method for determining the functional capability of a brake system with a wheel brake and a movable brake piston includes setting first and second braking forces on the brake piston with a hydraulic pressure generator and an electromechanical actuator, respectively, to set a parking brake force at the wheel brake. The method further includes actuating the actuator to set a third braking force on the brake piston with a value lower than the first and second braking forces. The hydraulic pressure generator is then actuated to set the first braking force after the third braking force is set. The actuator is then actuated to set the second braking force after the first braking force is set. The functional capability of the brake system is determined when the operating current during application of the second braking force temporarily corresponds to an open-circuit current of the actuator.

10 Claims, 2 Drawing Sheets

(56) References Cited

U.S. PATENT DOCUMENTS

| | | | |
|---|---|---|---|
| 2015/0019101 A1* | 1/2015 | Bajorat | B60T 7/085 |
| | | | 701/71 |
| 2015/0239439 A1* | 8/2015 | Sussek | B60T 8/171 |
| | | | 701/70 |
| 2016/0339897 A1* | 11/2016 | Baehrle-Miller | B60T 17/221 |

* cited by examiner

METHOD AND DEVICE FOR DETERMINING THE FUNCTIONAL CAPABILITY OF A BRAKE SYSTEM, BRAKE SYSTEM FOR A VEHICLE

This application claims priority under 35 U.S.C. § 119 to patent application no. DE 10 2016 218 898.4, filed on Sep. 29, 2016 in Germany, the disclosure of which is incorporated herein by reference in its entirety.

BACKGROUND

The disclosure relates to a method for determining the functional capability of a brake system which has at least one wheel brake with a movable brake piston, a hydraulic pressure generator for setting a first braking force which acts on the brake piston, and an electromechanical actuator for setting a second braking force which acts on the brake piston, wherein in order to set a parking braking force at the wheel brake the hydraulic pressure generator and the actuator are actuated.

Furthermore, the disclosure relates to a device for executing the method and to a corresponding brake system.

Methods, devices and brake systems of the type mentioned in the introduction are known from the prior art. Wheel brakes which can be actuated both hydraulically and electromechanically are usually used to set a braking force hydraulically during the normal operation of the motor vehicle and electromechanically for the implementation of a parking brake function (parking brake). The advantage here is that the electromechanical activation of the brake system, which is otherwise activated hydraulically, makes possible a particularly compact configuration of a hydraulic wheel brake with an electromechanical parking brake integrated therein. Owing to the self-locking which is usually provided for the electromechanical actuator, the latter holds the brake piston in the parking brake position even when the hydraulic pressure is reduced again. This ensures that the parking braking force is maintained in an energy-saving and simple fashion. In order to set the parking brake function or the parking braking force, the brake piston is activated both hydraulically and electromechanically, so as to relieve the loading on the electromechanical actuator during the setting of the parking braking force.

SUMMARY

The method according to the disclosure provides the advantage that it is easily possible to determine whether the brake system in its entirety is functioning correctly, in particular whether the hydraulic part of the brake system is functioning and, for example, does not have a leak or a disconnected line. According to the disclosure this is achieved in that when the parking brake force is set the electromechanical actuator is firstly actuated in order to set a third braking force which acts on the brake piston and is lower than the first and the second braking forces. Therefore, as a result of the actuation of the actuator in the first step a), the maximum of the braking force which is to be made available by the actuator is still not set. Subsequently, in a step b) the hydraulic pressure generator is actuated in order to set the first braking force, after the actuation of the first actuator in step a) has been ended or concluded. Subsequently, the electromechanical actuator is actuated again in order to set the second braking force. However, this does not take place until the setting of the first braking force in step b) has been ended or concluded. While the electromechanical actuator in step c) is actuated in order to set the second braking force, its operating current is measured and monitored, wherein the functional capability of the brake system is determined as a function of the measured operating current. For this purpose, the operating current is compared, in step e), with an open-circuit current of the electromechanical actuator which is determined, in particular, during the first application of the brake, that is to say in particular in step a). In this context it is assumed that when the hydraulic system of the brake system is functioning satisfactorily a hydraulic force is applied to the brake piston as a result of the actuation of the hydraulic pressure generator in step b), said hydraulic force exceeding the setting force of the actuator and as a result relieving the loading on the electromechanical actuator so that a mechanical play (clearance play) arises between the actuator and the brake piston. During the renewed actuation of the actuator in step c) the latter must therefore initially overcome the clearance play before the second braking force can be set at the brake piston. While the clearance play is being overcome, the actuator therefore runs in "no load" mode or virtually free of loading, for which reason this phase is also referred to as the idling phase. This phase usually also occurs when the actuator is first actuated in step a) before a force is applied to the brake piston by the actuator. By comparing the current operating current of the actuator in step c) with the expected open-circuit current it is therefore easily possible to determine whether the desired hydraulic force has actually been successfully applied to the brake piston by the hydraulic pressure generator in order to set the first braking force. If it is detected that the operating current corresponds to the open-circuit current, in particular corresponds precisely or virtually precisely, it is determined that the brake system, in particular the hydraulic part of the brake system, is functionally capable, and for example further operation of the brake system is permitted.

According to one preferred development of the disclosure there is provision that in step a) the operating current of the actuator is measured in order to determine the open-circuit current. Because the operating current usually drops directly after the actuator is first switched on, and while the clearance play is being overcome remains at a low value before it rises again if a braking force is built up at the brake piston, the open-circuit range of the operating current profile can easily be determined. The operating current which is measured in this open-circuit range is then retained as the open-circuit current and then serves in step e) as a reference value or comparison value. In this context, the measured operating current in the open-circuit range can also be averaged in order to determine the open-circuit current. As a result, the open-circuit current can easily be determined. Alternatively, there is preferably provision that the open-circuit current is predefined for the comparison for example on the basis of previous attempts and/or calculations.

Furthermore there is preferably provision that the operating current which occurs between the actuator and the brake piston when the mechanical play is overcome is detected as the open-circuit current, as already mentioned.

Furthermore, there is preferably provision that a warning message is output if the functional capability cannot be determined in step e). If the functional capability cannot be determined because the operating current of the actuator which is measured in step c) exceeds the open-circuit current, in particular beyond a predefinable tolerance range, it is to be assumed that the hydraulic system or the hydraulic part of the brake system is faulty. Correspondingly, a warning message is output for example visually and/or acoustically, for example to the driver of a motor vehicle having the brake system.

According to one preferred development of the disclosure there is provision that a parking braking force which acts on the brake piston and ultimately corresponds to the second braking force is selected with a larger value in step c) than the first braking force. The parking braking force therefore can be achieved only if both the actuator and the hydraulic pressure generator function satisfactorily.

Furthermore there is preferably provision that the second braking force is selected with a larger value than the first braking force. This ensures that when the actuator is actuated in step c), the clearance play is reliably overcome and a force build-up at the brake piston occurs again by means of the actuator, with the result that the functional capability of the hydraulic part of the brake system can be reliably determined.

Furthermore there is preferably provision that after the functional capability is determined in step e) the hydraulic pressure generator is actuated in such a way that it keeps the first braking force constant. In particular there is provision that the hydraulic pressure generator is not switched off until after the conclusion of the checking/determination, with the result that only the second braking force which is set by the electromechanical actuator still acts on the brake piston. Because the actuator is, in particular, embodied in a self-locking fashion, the braking force is maintained even when the electromechanical actuator alone would not be able to move the brake piston an appropriate distance or apply a force to it.

Furthermore, there is preferably provision that the brake system has at least two wheel brakes which are embodied in the way described above, wherein when the parking braking force is set the operating currents of the actuators of the at least two wheel brakes are compared with one another in order to check the plausibility of the determination in step e). This minimizes the probability of a malfunction of the brake system being detected owing to an incorrect calculation.

The device according to the disclosure is distinguished by a control unit which is specifically configured to execute the method according to the disclosure in the case of use according to the specifications. In this context, the advantages already mentioned arise. The device can also comprise two or more control units which execute the method together. Therefore, the method can be executed for example by an ESP control unit and a brake control unit of an electromechanical brake booster jointly.

The brake system according to the disclosure is distinguished by the device according to the disclosure. The advantages already specified are obtained here.

Further advantages and preferred features and combinations of features arise, in particular, from what has been described above and from the claims.

BRIEF DESCRIPTION OF THE DRAWINGS

The disclosure is to be explained in more detail below on the basis of the drawings, in which.

DETAILED DESCRIPTION

Figure 1:
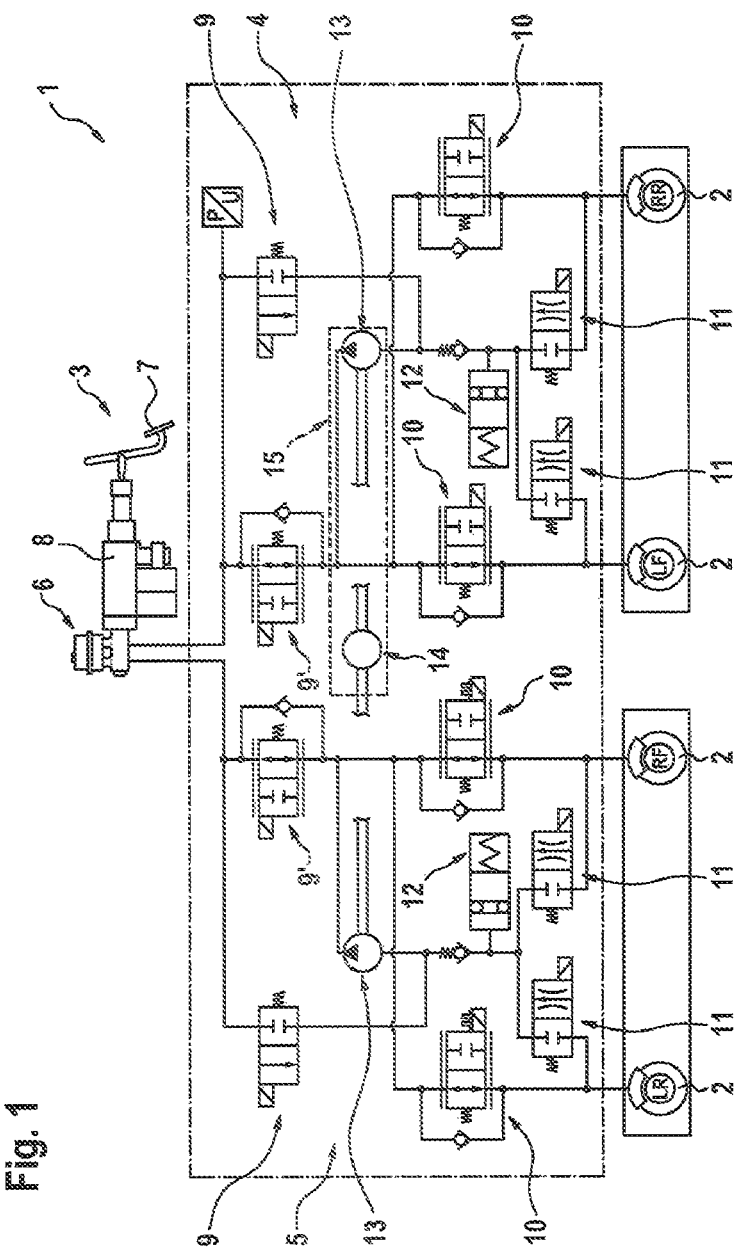
FIG. 1 shows a motor vehicle having a brake system in a simplified plan view.

FIG. 1 shows a simplified illustration of a brake system 1 for a motor vehicle (not illustrated in more detail here). The brake system 1 has a plurality of wheel brakes 2 which can be activated by a driver of the motor vehicle by a brake pedal apparatus 3 as service brakes. The wheel brakes 2 are denoted here by LR, RF, LF and RR, as a result of which their position or assignment on the motor vehicle is explained, wherein LR stands for left rear, RF for right front, LF for left front and RR for right rear. Two brake circuits 4 and 5 are formed between the brake pedal apparatus 3 and the wheel brakes 2, wherein the brake circuit 4 is assigned to the wheel brakes LF and RR, and the brake circuit 5 to the wheel brakes LR and RF. The two brake circuits 4 and 5 are of identical design, with the result that the structure of the two brake circuits 4, 5 is to be explained in more detail below on the basis of the brake circuit 4.

The brake circuit 4 is initially connected to a master brake cylinder 6 of the brake pedal apparatus 3, wherein the brake pedal apparatus 3 also has a brake pedal 7 which can be actuated by the driver, in particular with a pedal travel sensor, and a vacuum brake booster 8 or alternatively an electromechanical brake booster. The brake circuit 4 has a switchover valve 9' and a high-pressure switching valve 9 which are connected in parallel with one another and follow the master brake cylinder 6. The switchover valve 9' is embodied so as to be open in the currentless state and permits the hydraulic medium of the brake circuit, that is to say the brake fluid, to flow in both directions. The high-pressure switching valve 9 is embodied so as to be closed in the currentless state and in the energized state permits brake fluid to flow through only in the direction of the wheel brakes 2. The switchover valve 9' is also connected to the two wheel brakes 2 with the intermediate connection of, in each case, an inlet valve 10 which is embodied so as to be opened in both directions in the currentless state. Each of the wheel brakes 2 of the brake circuit 4 is also assigned an outlet valve 11 which is embodied so as to be closed in the currentless state. A hydraulic pressure accumulator 12 is connected downstream of the outlet valves 11. On the outlet side, the outlet valves 11 are also connected to a suction side of a pump 13 which is connected to the brake circuit 4 on the pressure side between the switchover valve 9' and the inlet valves 10. The pump 13 is mechanically coupled to an electric motor 14, wherein the pump and the electric motor 14 together form a hydraulic pressure generator 15 of the brake system 1. There is provision for the electric motor 14 to be assigned to the pumps 13 of both brake circuits 4 and 5. Alternatively there may also be provision that each brake circuit 4, 5 has a separate electric motor 14. The electromechanical brake booster 8 also forms a hydraulic pressure generator of the brake system. Both hydraulic pressure generators, that is to say the hydraulic pressure generator 15 and the brake booster 8, are provided in the brake system 1 here. However, it is also possible to provide just one of the two. The pump 13 may be embodied, for example, as a hydraulic plunger/piston or as a piston pump or as a rotational pump.

If the two switchover valves 9' of the brake circuits 4, 5 are closed, the hydraulic pressure remains shut in or maintained in the section of the brake circuits 4, 5 located downstream thereof, that is to say between the switchover valves and the wheel brakes 2, even if the brake pedal 7 is relieved of loading by the driver.

Figure 2:
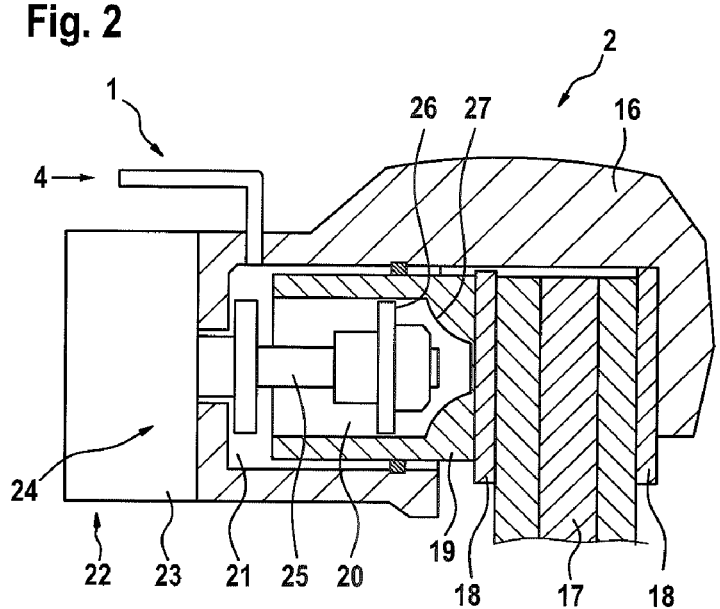
FIG. 2 shows a wheel brake of the brake system in a simplified sectional illustration.

FIG. 2 shows a simplified sectional illustration of the configuration of the wheel brakes 2. The respective wheel brake 2 has a brake caliper 16 which engages around a brake disk 17, which is connected in a rotationally fixed fashion to a wheel of the motor vehicle, on the end sides thereof. Each end side of the brake disk 17 is assigned here a brake lining 18 of the wheel brake 2. One of the brake linings 18 is embodied or arranged here on an end side of a brake piston 19 which is slidably mounted with respect to the brake caliper 16. The brake piston 19 has a cup-shaped structure in the longitudinal section with the result that it forms a cavity 20 together with a receptacle 21 of the brake caliper 16 in which the brake piston 19 is mounted in a slidable fashion. The cavity 20 is fluidically connected here to the inlet valve 10, with the result that when the inlet valve 10 and the switchover valve 9' are opened, and the brake pedal 7 is actuated, the hydraulic pressure acts on the brake piston 19 in order to move it against the brake disk 17, as a result of which the brake disk 17 is tensioned or clamped between the brake linings 18 of the wheel brake 7. Alternatively, by closing the switchover valve 9' and actuating the pressure generator 15 the hydraulic pressure can be generated in the brake circuit 4 in an automated fashion. This is the case here when the driver operates a pushbutton key or switch for actuating a parking brake.

The brake piston 19 is also assigned an electromechanical actuator 22 which has an electric motor 23 and a transmission 24 which is operatively connected to the electric motor 23. The transmission is embodied as a spindle drive which comprises a spindle 25 which is connected in a rotationally fixed fashion to the electric motor 23, and a spindle nut 26 which is mounted in a rotationally fixed fashion in the brake piston 19 and in a longitudinally slidable fashion on the spindle 25. If the spindle is driven by the electric motor 23, as a result the spindle nut 26 is longitudinally slid in the brake piston 19. In this context, the spindle nut 26 can be slid by the rotational movement of the spindle 25 to such an extent that said spindle nut 26 impacts against an axial stop 27 of the brake piston 19 in the space 20, as a result of which the brake piston 19 is entrained by the spindle nut 26. As a result of the actuation of the actuator 22, a force can therefore also be applied to the brake piston 19 in order to move it, on which force the force applied by the hydraulic pressure is or can be superimposed.

The parking brake function of the brake system 1 is thus implemented by generating the braking force by means of the pressure generator 15 and the actuator 22, wherein the hydraulic pressure of the pressure generator assists the actuator 22 or relieves the loading thereon, as a result of which the actuator 22 itself can be given smaller dimensions and still applies sufficient force to secure the parking brake or the brake system. In order to ensure a stationary state it is necessary to monitor the contributions of force of the pressure generator and actuator 22. This ensures that, for example, the hydraulic pressure assistance during the brake application process is actually effected. A fracture in a brake line or a disconnected brake line can lead to a situation in which during a brake application process the wheel brakes are not sufficiently hydraulically assisted and therefore the necessary brake application forces cannot be achieved. The direct measurement of the hydraulic pressure in the respective brake circuit 4, 5 is itself unsuitable if the respective line is disconnected. A pressure sensor which is usually assigned to the master brake cylinder merely determines the pressure in the master brake cylinder, but said pressure does not correspond to the hydraulic pressure in or at the wheel brake 2, in particular if the feedline is disconnected.

Figure 3:
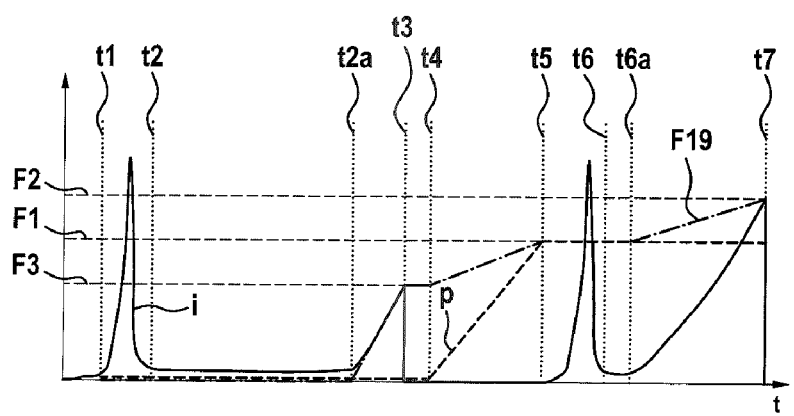
FIG. 3 shows a diagram for explaining the operation of a brake system.

A brake application process or the setting of the parking brake function at a wheel brake 2 by the brake system 1 is illustrated in FIG. 3 by means of a diagram. For the brake application process, both the actuator 22 and the hydraulic pressure generator 15 are actuated in order to respectively set a braking force for a parking brake operation. It is known that the hydraulic pressure generator 15 sets a first braking force F1, and the actuator 22 sets a second braking force F2, which braking forces F1, F2 are superimposed at the brake piston 19 in order to set a parking braking force of the brake shoe 18 against the brake disk 17. In the diagram, the hydraulic pressure p which acts on the brake piston from the hydraulic pressure generator 15, and the operating current i of the actuator 22 which arises as a function of the actuating force of the actuator 22 acting on the brake piston, is plotted over the time t for a parking brake process. Furthermore, FIG. 3 shows the braking force F19 which acts on the brake disk 17 from the brake piston 19 and results from the hydraulic pressure p and the actuating force of the actuator 22. The driver initiates the brake application process at the time t0, for example via a parking brake switch.

The method described below ensures that the functional capability of the brake system 1, in particular of the hydraulic part of the brake system 1, can be determined during operation.

After the initiation process at the time $t_0$, the electromechanical actuator 22 is actuated in a first step a) at the time $t_1$, or actuated to set a braking force F3 which is lower than the braking force F2. The result of this is that a switch-on peak can be seen in the operating current of the actuator 22. This occurs, inter alia, as a result of the fact that particularly large forces are necessary at the start of the activation, for example in order to overcome frictional resistances from the stationary state. This can be seen in FIG. 3 on the basis of the increased operating current (current peak) after the time t1.

As soon as the actuator 22 has overcome the breakaway forces, it enters the so-called idling mode in which a clearance play is overcome between the actuator 22, in particular the electric motor 23, and the brake piston. The operating current i therefore initially drops and reaches, at the time t2, a low value at which it remains until the spindle nut 26 strikes the piston 19 and forces it against the brake disk 17. At this time t2a, the force which counteracts the actuator 22 and corresponds to the braking force acting on the brake disk 17 increases. The working force of the actuator 22 therefore increases until a braking force F3 is reached at the time t3. At this time, the actuator 22 has reliably overcome the clearance play and has set the braking force F3 which acts on the brake disk 17. At the time t3, the actuation of the electric motor 23 is therefore ended and the actuator 22 is deactivated, with the result that the operating current i returns to zero. FIG. 3 shows in this respect the expected profile of the forces, and in correlation therewith, of the operating current of the actuator 22.

In a subsequent step b), at a time t4, the hydraulic pressure generator 15 is actuated in order to increase the hydraulic pressure p which is applied to the brake piston 19. In this context, the hydraulic pressure p increases from the time t4 to the time t5 at which the hydraulic pressure made available by the hydraulic pressure generator 15 gives rise to the braking force F1 at the time t5. Subsequently, a further increase in hydraulic pressure is prevented and the hydraulic pressure generator 15 is actuated so as to keep the braking force F1 constant. Because the braking force F1 is larger than the braking force F3, it is to be expected that the brake piston 19 will be moved further by the hydraulic pressure than by the actuator 22, with the result that a clearance play is set again in the action chain between the actuator 22 and the brake piston 19 or brake disk 17.

At the time t5, that is to say after the first braking force F1 is reached by the hydraulic pressure generator 15, in a step c) the electromechanical actuator 22 is actuated again in order to set the second braking force F2. Again, a switch-on peak occurs in the operating current i, the operating current i or the working force subsequently drops to a low value at the time t6. In particular, the open-circuit current or the open-circuit force is reached again. At the time t6a, after the new clearance play has been overcome a force is built up again at the brake disk 17 by the actuator 22, and this time up to the braking force F2 at the time t7. This is the case only if the brake piston 19 actually continues to be held with the hydraulic braking force F1. In the case of a fault in the hydraulic system, the hydraulic load relief can fall away, which leads to a situation in which no clearance play is overcome or an open-circuit operating mode is reached during the subsequent actuation of the actuator 22.

In a fault situation in which the hydraulic system is damaged, the braking force F1 cannot be reached by the hydraulic generator 15. This results in no clearance play being generated after it has initially been overcome at a time $t2_a$. This would result in an open-circuit state being unable to be reached in the further course at the time t6, but instead the actuator 22 would directly bring about a build-up of force at the wheel brake 2. Therefore, the open-circuit phase would fail to occur and the operating current would not be able to reach the open-circuit current in the time period t6 to t6a.

Therefore, at the time t6 to $t6_a$ it is possible to detect, through a simple comparison between the operating current and the expected open-circuit current in step c), whether the hydraulic system and therefore the brake system 1 is functioning correctly. If it is determined that the operating current corresponds, or virtually corresponds, at least temporarily to the open-circuit current when the actuator 22 is actuated again, it is determined that the brake system 1 is functioning correctly. However, if it is determined that the operating current i does not reach the open-circuit current or does not drop to the open-circuit current, it is determined that the brake system 1 is not functioning correctly or is faulty. In particular, a fault message or warning message is then transmitted to the driver of the motor vehicle having the brake system 1, with the result that the driver is informed that he should drive to a workshop.

What is claimed is:

1. A method for determining a functional capability of a brake system that includes at least one wheel brake with a movable brake piston, a hydraulic pressure generator for setting a first braking force that acts on the brake piston, and an electromechanical actuator for setting a second braking force that acts on the brake piston, the hydraulic pressure generator and the actuator actuated to set a parking braking force at the wheel brake, the method comprising:
    actuating the actuator to set a third braking force that acts on the brake piston, the third braking force selected with a value lower than the first and second braking forces;
    actuating the hydraulic pressure generator to set the first braking force after the actuator is actuated to set the third braking force;
    actuating the actuator to set the second braking force after the hydraulic pressure generator is actuated to set the first braking force;
    monitoring an operating current of the actuator during actuation of the actuator to set the second braking force; and
    determining the functional capability of the brake system only when the operating current of the actuator during actuation of the actuator to set the second braking force temporarily corresponds to an open-circuit current of the actuator.

2. The method according to claim 1, wherein during actuation of the actuator to set the third braking force, the operating current of the actuator is measured to determine the open-circuit current.

3. The method according to claim 1, wherein the operating current that occurs between the actuator and the brake piston when a mechanical play is overcome is detected as the open-circuit current.

4. The method according to claim 1, wherein a warning message is output if the functional capability cannot be determined.

5. The method according to claim 1, wherein a parking braking force that acts on the brake piston when the actuator is actuated to set the second braking force is set with a value larger than the first braking force.

6. The method according to claim 1, wherein the second braking force is set with a value larger than the first braking force.

7. The method according to claim 1, wherein the hydraulic pressure generator is actuated so as to determine the functional capability in order to keep the first braking force constant.

8. The method according to claim 1, wherein the brake system includes a second wheel brake with a moveable second brake piston, a second hydraulic pressure generator for setting a fourth braking force that acts on the second brake piston, and a second electromechanical actuator for setting a fifth braking force that acts on the second brake piston, the second hydraulic pressure generator and the second actuator actuated to set a second parking braking force at the second wheel brake, the method further comprising:
    actuating the second actuator to set a sixth braking force that acts on the second brake piston, the sixth braking force selected with a value lower than the fourth and fifth braking forces;
    actuating the second hydraulic pressure generator to set the fourth braking force after the second actuator is actuated to set the sixth braking force;
    actuating the second actuator to set the fifth braking force after the second hydraulic pressure generator is actuated to set the fourth braking force;
    monitoring a second operating current of the second actuator during actuation of the second actuator to set the fifth braking force;
    determining a second functional capability of the brake system only when the second operating current of the second actuator during actuation of the second actuator to set the fifth braking force temporarily corresponds to an second open-circuit current of the second actuator; and
    comparing the operating current of the actuator and the second operating current of the second actuator to check the plausibility of the determined functional capability of the brake system.

9. A device for operating a brake system that includes at least one wheel brake with a movable brake piston, a hydraulic pressure generator configured to set a first braking force that acts on the brake piston, and an electromechanical actuator configured to set a second braking force that acts on the brake piston, the device comprising:
    a control unit configured to execute a method for determining a functional capability of the brake system, the method including:

actuating the actuator to set a third braking force that acts on the brake piston, the third braking force selected with a value lower than the first and second braking forces, actuating the hydraulic pressure generator to set the first braking force after the actuator is actuated to set the third braking force, actuating the actuator to set the second braking force after the hydraulic pressure generator is actuated to set the first braking force, monitoring an operating current of the actuator during actuation of the actuator to set the second braking force, and determining the functional capability of the brake system only when the operating current of the actuator during actuation of the actuator to set the second braking force temporarily corresponds to an open-circuit current of the actuator.

10. A brake system for a motor vehicle, comprising:

at least one wheel brake with a movable brake piston;

a hydraulic pressure generator configured to set a first braking force that acts on the brake piston;

an electromechanical actuator configured to set a second braking force that acts on the brake piston; and a device configured to operate the brake system, the device including a control unit configured to execute a method for determining a functional capability of the brake system, the method including:

actuating the actuator to set a third braking force that acts on the brake piston, the third braking force selected with a value lower than the first and second braking forces, actuating the hydraulic pressure generator to set the first braking force after the actuator is actuated to set the third braking force, actuating the actuator to set the second braking force after the hydraulic pressure generator is actuated to set the first braking force, monitoring an operating current of the actuator during actuation of the actuator to set the second braking force, and determining the functional capability of the brake system only when the operating current of the actuator during actuation of the actuator to set the second braking force temporarily corresponds to an open-circuit current of the actuator.

* * * * *